United States Patent
Miyahara

(10) Patent No.: US 12,001,735 B2
(45) Date of Patent: Jun. 4, 2024

(54) INSPECTION SYSTEM, INFORMATION PROCESSING APPARATUS, PRINTING APPARATUS, METHOD OF CONTROLLING THE INFORMATION PROCESSING APPARATUS, METHOD OF CONTROLLING THE PRINTING APPARATUS, AND STORAGE MEDIUM

(71) Applicant: CANON KABUSHIKI KAISHA, Tokyo (JP)

(72) Inventor: Nobuaki Miyahara, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/888,751

(22) Filed: Aug. 16, 2022

(65) Prior Publication Data
US 2023/0068383 A1 Mar. 2, 2023

(30) Foreign Application Priority Data
Aug. 30, 2021 (JP) ................................ 2021-140268

(51) Int. Cl.
*G06F 3/12* (2006.01)
(52) U.S. Cl.
CPC ............ *G06F 3/1234* (2013.01); *G06F 3/121* (2013.01); *G06F 3/1267* (2013.01)
(58) Field of Classification Search
CPC ..... G06F 3/1208; G06F 3/1253; G06F 3/1282
See application file for complete search history.

(56) References Cited

U.S. PATENT DOCUMENTS

| 2019/0180431 | A1 | 6/2019 | Kaneko |
| 2020/0104987 | A1* | 4/2020 | Nakano .............. H04N 1/00047 |
| 2021/0118115 | A1* | 4/2021 | Tsukamoto ............ G06T 7/001 |
| 2021/0201097 | A1 | 7/2021 | Obayashi et al. |

FOREIGN PATENT DOCUMENTS

JP 2019161345 A 9/2019

OTHER PUBLICATIONS

Extended European search report issued in European Appln. No. 22188934.8 dated Jan. 27, 2023.

* cited by examiner

*Primary Examiner* — John R Wallace
(74) *Attorney, Agent, or Firm* — ROSSI, KIMMS & McDOWELL LLP

(57) ABSTRACT

An information processing apparatus holds a print job and identification information of a reference image that is associated with the print job and is used in inspection printing of the print job. In a case that a reprint according to the held print job is instructed, the information processing apparatus determines whether or not a change has been made in print settings of the held print job and whether or not inspection printing that uses the reference image being associated with the held print job is possible, and in a case that it is determined that the inspection printing that uses the reference image being associated with the held print job is not possible, controls so as to set the identification information of the reference image in the held print job to none and transmits the held print job to the printing apparatus.

9 Claims, 10 Drawing Sheets

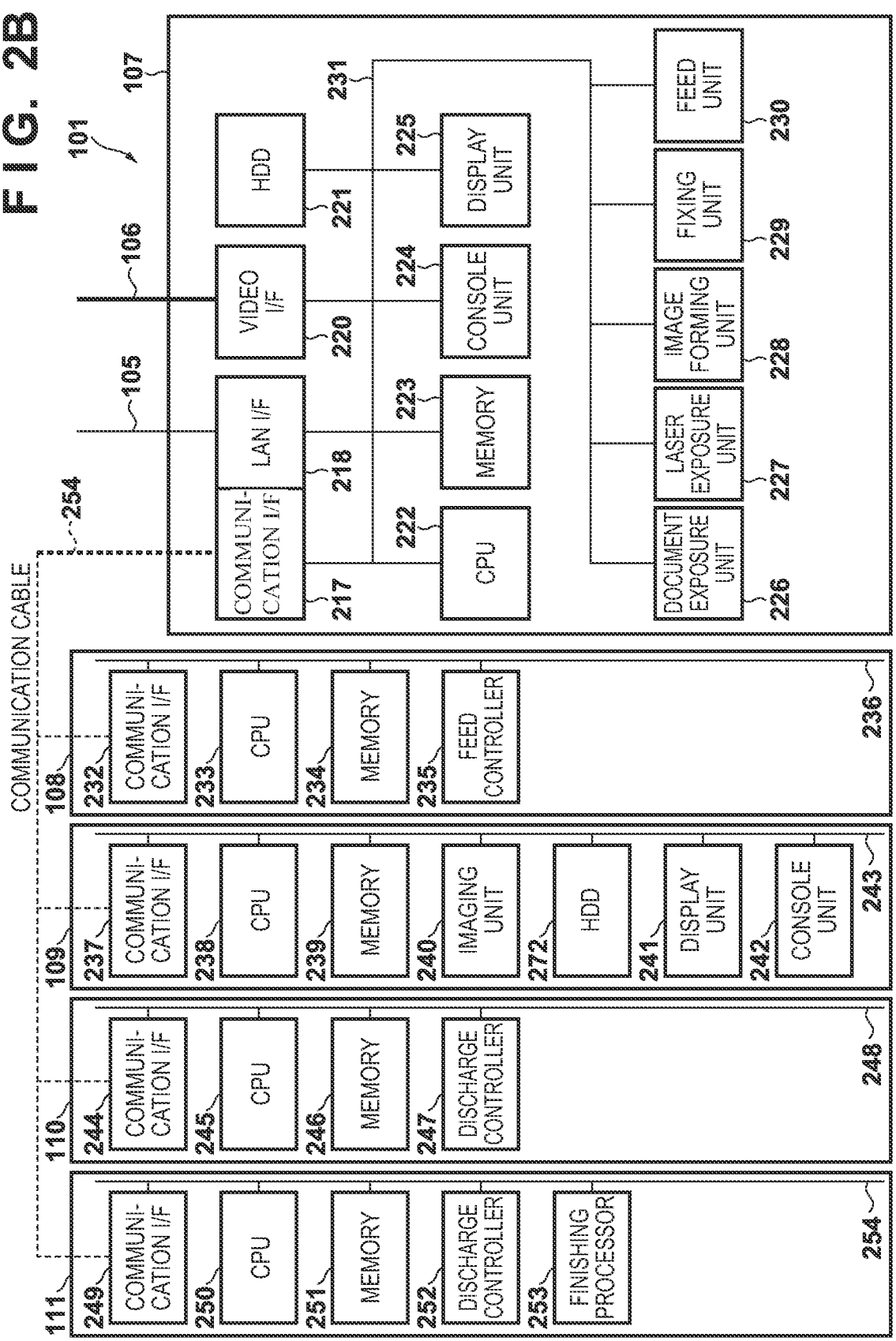

INSPECTION SYSTEM, INFORMATION PROCESSING APPARATUS, PRINTING APPARATUS, METHOD OF CONTROLLING THE INFORMATION PROCESSING APPARATUS, METHOD OF CONTROLLING THE PRINTING APPARATUS, AND STORAGE MEDIUM

BACKGROUND OF THE INVENTION

Field of the Invention

The present invention relates to an inspection system, an information processing apparatus, a printing apparatus, a method of controlling the information processing apparatus, a method of controlling the printing apparatus, and a storage medium.

Description of the Related Art

In recent years, print systems capable of inspecting an image printed on a sheet by a printing apparatus using an inspection apparatus during conveyance of the sheet have been known. In such inspection of a printing sheet, an inspection apparatus determines whether a printed image is normal by reading an image on a conveyed printed sheet and analyzing image data obtained by the reading. Inspection by an inspection apparatus makes it possible to detect, for example, a lack of image and a printing anomaly. Similarly to when printing, a flow of this inspection by an inspection apparatus includes registering an image converted into a bitmap as a reference image in the inspection apparatus in advance. Then, when executing a print job, a registered reference image is specified in the print job, and a printed product printed according to the print job is inspected using the specified registered reference image.

While such a print system including an inspection apparatus and a printing apparatus enables a user to obtain a desired printed product, it is necessary to execute a task, such as registering a reference image for inspection and searching for a corresponding reference image. Also, it takes time to create a reference image, which poses problems such as a lot of time being needed for printing. Therefore, Japanese Patent Laid-Open No. 2019-161345 discloses an inspection system capable of searching for a registered reference image.

A configuration of Japanese Patent Laid-Open No. 2019-161345 does not necessitate that a reference image be re-registered when re-executing and reprinting a print job and also automatically performs a task of searching for a reference image, which improves efficiency of a printing task. However, a reprint function of a print server makes it possible to make a change in print settings even when reprinting the same document of a print job, and depending on that setting, it may be necessary to convert document data of the print job to a bitmap again. In such a case, regardless of being based on the same document of the print job, a previously-used reference image corresponding to the print job cannot be reused, resulting in a search for a reference image, which takes time. Further, in a print system that stores reference images of print jobs stored in a print server in an inspection apparatus in consideration of a reprint by the print server, there is a problem that an amount of the reference images increases, resulting in a search needing a large amount of time in the inspection apparatus, which decreases reprint throughput.

SUMMARY OF THE INVENTION

An aspect of the present invention is to eliminate the above-mentioned problem with conventional technology.

A feature of the present invention is to provide a technique of automating creation and registration of a reference image for a reprint job re-executed due to a change in print settings, enabling a user to execute the reprint job without being pconscious of the creation and the registration of the reference image.

According to a first aspect of the present invention, there is provided an information processing apparatus operable to input a print job to a printing apparatus and cause the printing apparatus to print the print job, the information processing apparatus comprising: one or more memories storing instructions; and one or more processors that execute the instructions being configured to: hold a print job and identification information of a reference image that is associated with the print job and is used in inspection printing of the print job; in a case that a reprint according to the held print job is instructed, determine whether or not a change has been made in print settings of the held print job and whether or not inspection printing that uses the reference image being associated with the held print job is possible; and in a case that it is determined that the inspection printing that uses the reference image being associated with the held print job is not possible, control so as to set the identification information of the reference image in the held print job to none and transmit the held print job to the printing apparatus.

According to a second aspect of the present invention, there is provided an information processing apparatus operable to input a print job to a printing apparatus and cause the printing apparatus to print the print job, the information processing apparatus comprising: one or more memories storing instructions; and one or more processors that execute the instructions being configured to: hold a print job and identification information of a reference image that is associated with the print job and is used in inspection printing of the print job; in a case that a reprint according to the held print job is instructed, determine whether or not a change has been made in print settings of the held print job and whether or not an order of reference images being associated with the held print job or an orientation of a reference image being associated with the held print job changes; and in a case that it is determined that the order of the reference images being associated with the held print job or the orientation of the reference image being associated with the held print job changes, control so as to instruct an apparatus that performs inspection using the reference images to change the order of the reference images or the orientation of the reference image, attach the identification information of the reference images to the held print job, and transmit the held print job to the printing apparatus.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2B is a block diagram for describing a hardware configuration of an image forming apparatus according to the first embodiment.

DESCRIPTION OF THE EMBODIMENTS

Figure 1:
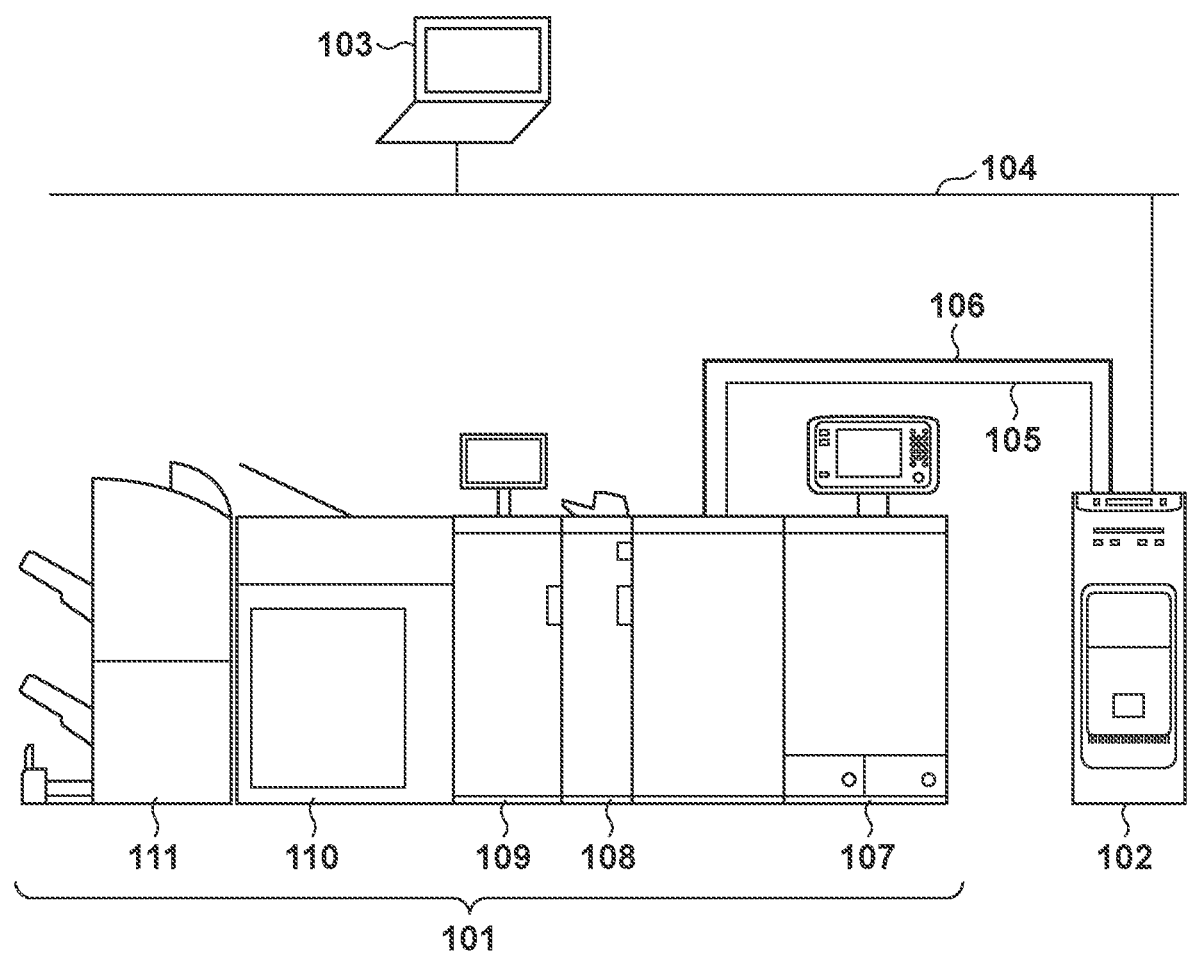
FIG. 1 is a diagram for describing an overall configuration of a print system according to a first embodiment of the present invention.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted. In the following descriptions, an external controller may be referred to as an information processing apparatus, a digital front end, a print server, a DFE, and the like. An image forming apparatus may be referred to as a multifunction device and a multifunction peripheral (MFP).

First Embodiment

FIG. 1 is a diagram for describing an overall configuration of a print system according to a first embodiment of the present invention.

This print system includes an image forming apparatus 101 and an external controller 102. The image forming apparatus 101 and the external controller 102 are connected via an internal LAN 105 and a video cable 106 so as to be capable of communication with each other. The external controller 102 is also connected to a client PC 103 via an external LAN 104 so as to be capable of communication therewith, and the client PC 103 can give a print instruction to the external controller 102.

A printer driver including a function for converting print data into a print description language (such as a page description language (PDL)) that can be processed by the external controller 102 is installed on the client PC 103. A user of the client PC 103 can give a print instruction from various applications via the printer driver. At this time, the printer driver transmits print data to the external controller 102 based on the print instruction from the user. When the print instruction is received from the client PC 103, the external controller 102 analyzes the print data and performs rasterization (RIP) processing to create image data for printing. Then, the print data is inputted to the image forming apparatus 101 via the internal LAN 105, and the rasterized image data is inputted to the image forming apparatus 101 via the video cable 106.

Next, the image forming apparatus 101 will be described.

In the image forming apparatus 101, apparatuses including a plurality of different functions are connected and configured so as to be capable of complicated print processing such as book binding. A printing apparatus 107 forms (prints) an image using toner on a sheet conveyed from a feed unit at a lower portion of the printing apparatus 107. Here, a description will be given using sheets as an example; however, print mediums, such as papers, sheets, films and the like may also be used. An example of a configuration and an operation principle of the printing apparatus 107 is as follows. A light beam, such as a laser beam, modulated according to image data is reflected by a rotating polygonal mirror, such as a polygon mirror, and is irradiated onto a photosensitive drum as a scanning beam. An electrostatic latent image formed on the photosensitive drum by the laser beam is developed using toner, and the toner image is transferred to a sheet attached to a transfer drum. A full color image is formed on a sheet by sequentially executing this series of image forming processes for yellow (Y), magenta (M), cyan (C), and black (K) toners. The sheet on the transfer drum on which the full color image is thus formed is conveyed to a fixing unit. The fixing unit includes a roller, a belt, and the like; contains a heat source, such as a halogen heater, in the roller; and melts, using heat and pressure, toner on a sheet to which a toner image has been transferred, thereby fixing the toner to the sheet.

An inserter 108 can insert a sheet at an arbitrary position into a group of sheets that have been printed by the printing apparatus 107 and conveyed.

An inspection apparatus 109 reads an image on a conveyed sheet and compares it with reference image data (a correct image) registered in advance to determine whether a printed image is normal. Printed products that have been determined to be normal or not are, for example, discharged and sorted into normal printed products and error-occurring printed products.

A large volume stacker 110 is capable of stacking and storing a large volume of sheets. A finisher 111 performs finishing processing on conveyed sheets. This finishing processing includes processing such as stapling, punching, and saddle stitching, and a sheet bundle on which the finishing processing has been performed is discharged to a discharge tray.

Although the print system of FIG. 1 is configured by connecting the external controller 102 to the image forming apparatus 101, the present invention is not limited to a configuration in which the external controller 102 is connected. That is, a configuration may be taken so as to directly connect the image forming apparatus 101 to the external LAN 104 and directly transmit print data from the client PC 103 to the image forming apparatus 101. In this case, print processing is performed with data analysis and rasterization processing being performed in the image forming apparatus 101.

Figure 2A:
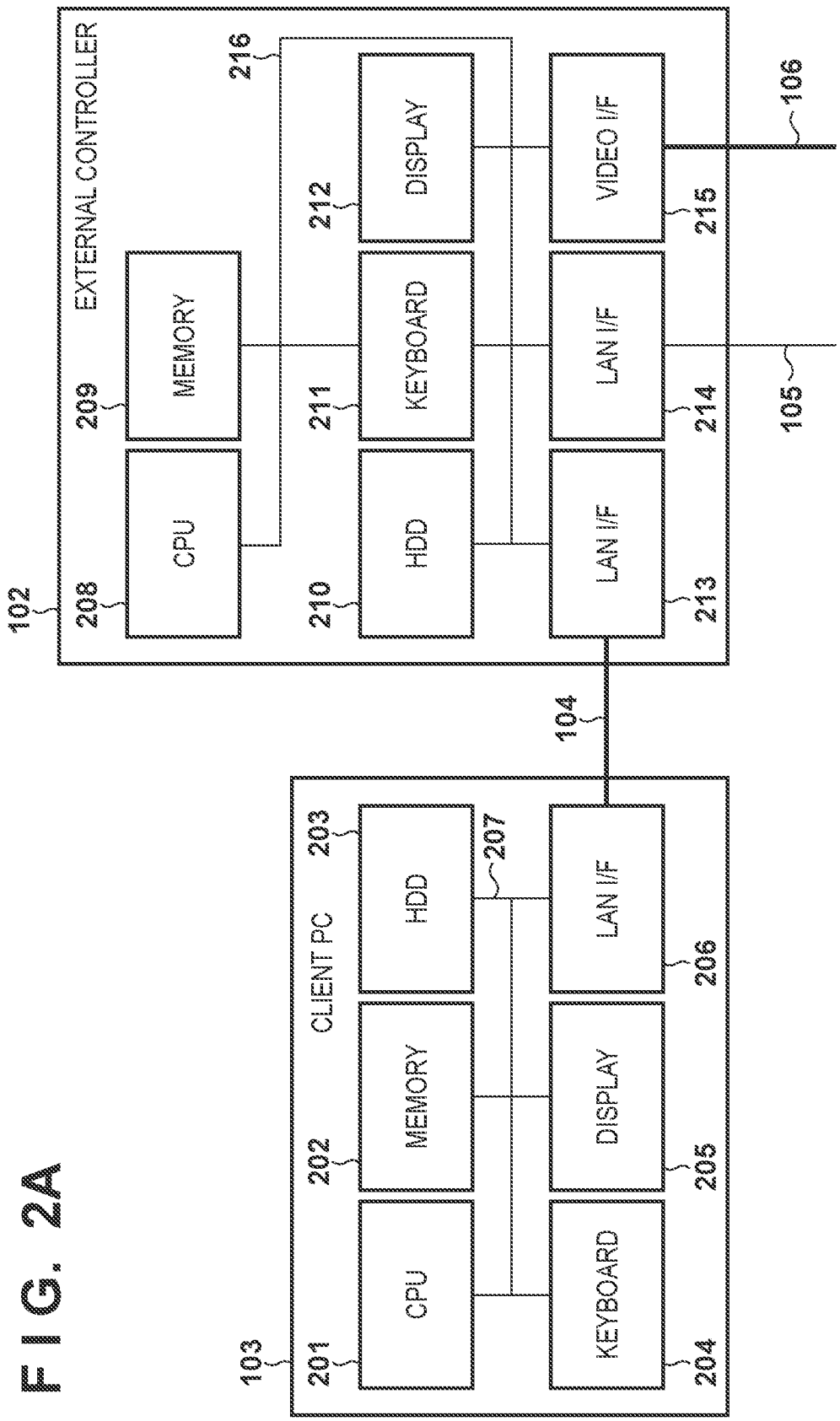
FIG. 2A is a block diagram for describing a hardware configuration of an external controller and a client PC according to the first embodiment.

FIGS. 2A and 2B are block diagrams for describing hardware configurations of the image forming apparatus 101, the external controller 102, and the client PC 103 according to the first embodiment.

Referring first to FIG. 2A, a configuration of the external controller 102 will be described.

The external controller 102 includes a CPU 208, a memory 209, an HDD 210, a keyboard 211, a display 212, a LAN interface (I/F) 213, a LAN I/F 214, and a video I/F 215, which are connected via a bus 216. The CPU 208 deploys in the memory 209 a program stored in the HDD 210, executes the deployed program to thereby perform processing, such as receiving print data from the client PC 103, processing for converting to bit map data (RIP processing), and transmitting print data to the image forming apparatus 101. The memory 209 includes a RAM, stores programs and data necessary for when the CPU 208 performs various kinds of processing, and operates as a work area. The HDD 210 stores programs and data necessary for operation, such as print processing. The keyboard 211 is an apparatus for inputting operation instructions to the external controller 102. The display 212 displays information, such as an application executed by the external controller 102, using still images and video signals of moving images. The LAN I/F 213 is connected with the client PC 103 via the external LAN 104 and performs communication for print instructions and the like. The LAN I/F 214 is connected with the image forming apparatus 101 via the internal LAN 105 and performs communication for print instructions and the like. The video I/F 215 is connected with the image forming apparatus 101 via the video cable 106 and performs communication for image data and the like.

Next, a configuration of the client PC 103 will be described. The client PC 103 includes a CPU 201, a memory 202, an HDD 203, a keyboard 204, a display 205, and a LAN I/F 206, which are connected via a bus 207. The CPU 201 deploys in the memory 202 a document processing program stored in the HDD 203, executes the deployed program, and executes print data creation and print instruction. The CPU 201 also comprehensively controls the respective devices connected to the bus 207. The memory 202 includes a ROM, a RAM, and the like; stores programs and data necessary for when the CPU 201 performs various kinds of processing; and operates as a work area of the CPU 201. The HDD 203 stores programs and data necessary for operations such as print processing. The keyboard 204 is an apparatus for inputting operation instructions to the PC 103. The display 205 displays information, such as an application executed by the client PC 103, using still images and video signals of moving images. The LAN I/F 206 is connected to the external LAN 104 and performs communication for print instructions and the like.

Next, referring to FIG. 2B, a configuration of the printing apparatus 107, the inserter 108, the inspection apparatus 109, the large volume stacker 110, and the finisher 111 of the image forming apparatus 101 according to the first embodiment will be described.

The printing apparatus 107 of the image forming apparatus 101 includes a communication I/F 217, a LAN I/F 218, a video I/F 220, an HDD 221, a CPU 222, a memory 223, a console unit 224, and a display unit 225. The printing apparatus 107 further includes a document exposure unit 226, a laser exposure unit 227, an image forming unit 228, a fixing unit 229, and a feed unit 230. These components are connected via a system bus 231.

The communication I/F 217 is connected to the inserter 108, the inspection apparatus 109, the large volume stacker 110, and the finisher 111 via a communication cable 254 and performs communication for controlling the respective apparatuses. The LAN I/F 218 is connected with the external controller 102 via the internal LAN 105 and performs communication for print instructions and the like. The video I/F 220 is connected with the external controller 102 via the video cable 106 and performs communication for image data and the like.

The HDD 221 is a storage apparatus in which programs and data are stored. The CPU 222 deploys in the memory 223 a program stored in the HDD 221, executes the deployed program, and comprehensively performs image processing control and printing control. The memory 223 includes a ROM and a RAM, stores programs and image data necessary for when the CPU 222 performs various kinds of processing; and operates as a work area of the CPU 222. The console unit 224 receives operation instructions and input for various settings from the user. The display (display unit) 225 displays setting information, a print job processing status, and the like of the image forming apparatus 101.

The document exposure unit 226 performs processing for reading a document when a copy function or a scan function is used. That is, the document exposure unit 226 reads document data by capturing an image using a CCD camera while illuminating an exposure lamp over a sheet set by the user. The laser exposure unit 227 performs primary charge for irradiating the photosensitive drum with a laser beam to transfer a toner image, and laser exposure. The laser exposure unit 227 first performs primary charging in which a surface of the photosensitive drum is charged to a uniform negative potential. Next, a laser beam is irradiated onto the photosensitive drum by a laser driver while an angle of reflection is adjusted using the polygon mirror. As a result, a negative charge of an irradiated portion is neutralized to form an electrostatic latent image. The image forming unit 228 is a device for transferring toner to a sheet; includes a developing unit, a transfer unit, a toner replenishing unit, and the like; and transfers toner on the photosensitive drum to a sheet. The developing unit visualizes an electrostatic latent image on a surface of the photosensitive drum by adhering negatively-charged toner thereto from a developing cylinder. The transfer unit performs primary transfer in which a positive potential is applied to the primary transfer roller to transfer toner on a surface of the photosensitive drum to the transfer belt and secondary transfer in which a positive potential is applied to the transfer roller to transfer toner on the transfer belt to a sheet. The fixing unit 229 is a device for melting and fixing toner on a sheet to the sheet using heat and pressure and includes a heater, a fixing belt, a pressing belt, and the like. The feed unit 230 is a device for feeding sheets, and a feed operation and a conveyance operation for sheets are controlled by rollers and various sensors.

Next, a configuration of the inserter 108 of the image forming apparatus 101 will be described. The inserter 108 of the image forming apparatus 101 includes a communication I/F 232, a CPU 233, a memory 234, and a feed controller 235, which are connected via a bus 236. The communication I/F 232 is connected to the printing apparatus 107 via the communication cable 254 and performs communication necessary for control. The CPU 233 executes a control program stored in the memory 234 to perform various controls necessary for sheet feeding. The memory 234 is a storage apparatus in which the control program is stored. Based on instructions from the CPU 233, the feed controller 235 controls feeding and conveyance of sheets conveyed from the printing apparatus 107 and a feed unit of the inserter 108 while controlling rollers and sensors.

Next, a configuration of the inspection apparatus 109 of the image forming apparatus 101 will be described.

The inspection apparatus 109 includes a communication I/F 237, a CPU 238, a memory 239, an imaging unit 240, a display unit 241, a console unit 242, and an HDD 272, which are connected via a bus 243. The communication I/F 237 is connected to the printing apparatus 107 via the communication cable 254 and performs communication necessary for control. Reference image data (reference image) used for inspection is also received from the printing apparatus 107 via the communication cable 254 and the communication I/F 237 and stored in the HDD 272. The CPU 238 executes a control program stored in the memory 239 to perform various controls necessary for inspection. The memory 239 includes a ROM and a RAM and stores the control program and the like. It is preferable for the memory 239 to include a large-volume rewritable non-volatile memory for registering reference image in a non-volatile manner.

Based on instructions of the CPU 238, the imaging unit 240 captures a conveyed sheet and reads an image printed on the sheet. The CPU 238 compares image data obtained by image capturing by the imaging unit 240 and a reference image stored in the memory 239 to determine whether a printed image is normal. The display unit 241 displays an inspection result, a setting screen, and the like. The console unit 242 is operated by the user and receives instructions, such as a change in settings of the inspection apparatus 109 and registration of a reference image. The HDD 272 stores reference images. When the HDD 272 is not provided, a configuration may be taken so as to store reference images in the HDD 221 of the printing apparatus 107 and, when performing processing for determining whether or not a printed image is normal (good or bad), read out the reference image from the HDD 221 to the memory 239 and use the reference image.

Next, a configuration of the large volume stacker 110 of the image forming apparatus 101 will be described.

The large volume stacker 110 includes a communication I/F 244, a CPU 245, a memory 246, and a discharge controller 247, which are connected via a bus 248. The communication I/F 244 is connected to the printing apparatus 107 via the communication cable 254 and performs communication necessary for control. The CPU 245 executes a control program stored in the memory 246 to perform various controls necessary for sheet discharge. The memory 246 includes a ROM, a RAM, and the like and stores the control program and the like. The discharge controller 247 conveys a conveyed sheet to a stack tray, an escape tray, or the subsequent finisher 111 based on instructions from the CPU 245.

Next, a configuration of the finisher 111 of the image forming apparatus 101 will be described.

The finisher 111 includes a communication I/F 249, a CPU 250, a memory 251, a discharge controller 252, and a finishing processor 253, which are connected via a bus 254. The communication I/F 249 is connected to the printing apparatus 107 via the communication cable 254 and performs communication necessary for control. The CPU 250 executes a control program stored in the memory 251 to perform various controls necessary for finishing and sheet discharge. The memory 251 includes a ROM, a RAM, and the like and stores the control program and the like. The discharge controller 252 controls sheet conveyance and sheet discharge based on instructions from the CPU 250. The finishing processor 253 performs finishing processing, such as stapling, punching, and saddle stitching, based on instructions from the CPU 250. Although, in the above description, the external controller 102 and the image forming apparatus 101 are connected to the internal LAN 105 and the video cable 106, a configuration need only be capable of transmitting and receiving data necessary for printing; for example, a configuration of connection need only be a video cable. In addition, each of the memory 202, the memory 209, the memory 223, the memory 234, the memory 239, the memory 246, and the memory 251 need only be a storage apparatus for holding data and programs. For example, a configuration may be taken so as to replace them with a volatile RAM, a non-volatile ROM, an internal HDD, an external HDD, a USB memory, and the like.

Figure 3:
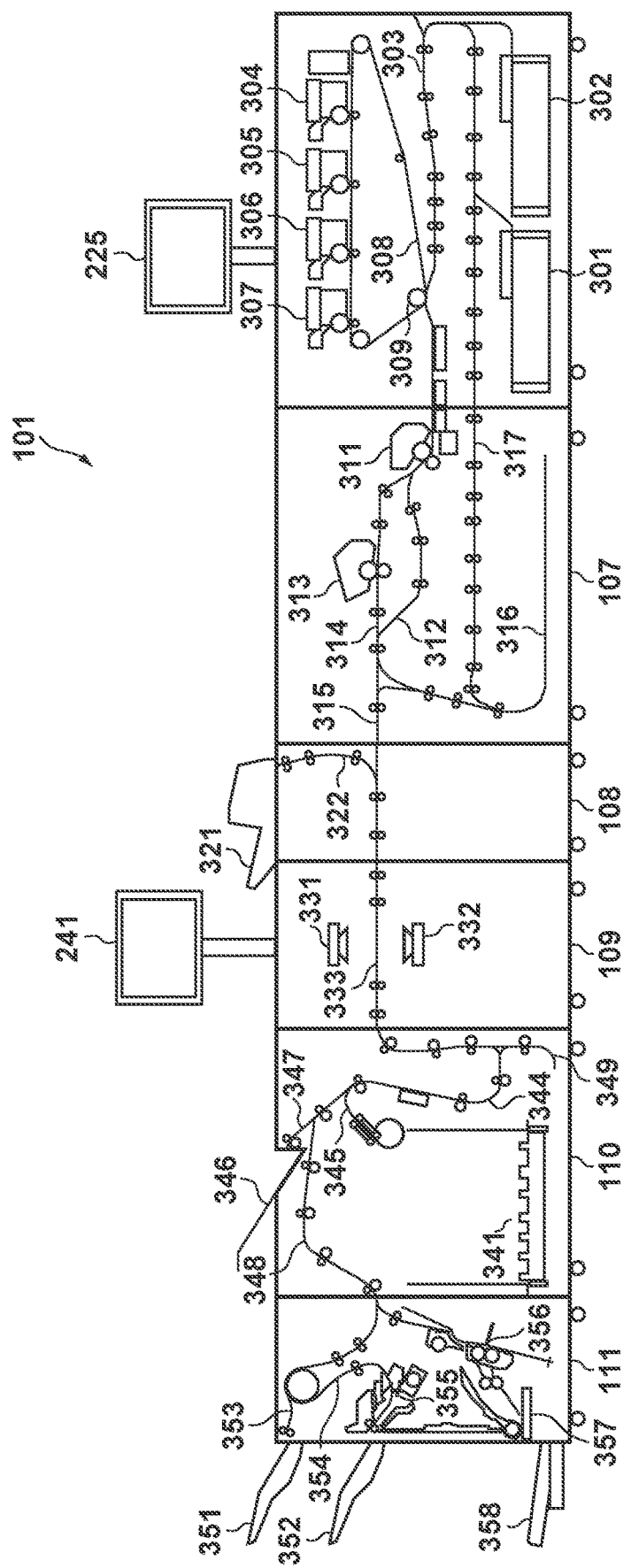
FIG. 3 depicts a schematic cross-sectional view illustrating a mechanism of the image forming apparatus according to the first embodiment.

FIG. 3 depicts a schematic cross-sectional view illustrating a mechanism of the image forming apparatus 101 according to the first embodiment.

First, the printing apparatus 107 will be described. The feed decks 301 and 302 can store a plurality of various types of sheets. Each feed deck separates a single uppermost sheet of the stored sheets and conveys it to a sheet conveyance path 303. Information (a sheet size and a sheet type) of the stored sheets can be set for each of the feed decks from the console unit 224 of the printing apparatus 107.

Developing stations 304 to 307 form toner images using colored toners of Y, M, C, and K, respectively, in order to form a color image. The toner images formed here are primary-transferred to an intermediate transfer belt 308 to form the color image on the intermediate transfer belt 308. The intermediate transfer belt 308 is rotationally driven in a clockwise direction in FIG. 3, and the color image is transferred to a sheet conveyed from the sheet conveyance path 303 at a secondary transfer position 309. The display unit 225 displays information for a printing status and settings of the image forming apparatus 101. A fixing unit 311 fixes the color image on a sheet to the sheet. The fixing unit 311 includes a pressure roller and a heating roller, and the color image is fixed to a sheet by melting and pressure bonding toner by passing the sheet to which the color image has been transferred between rollers. A sheet that has passed through the fixing unit 311 is conveyed to a conveyance path 315 through a sheet conveyance path 312. Depending on the type of sheet, if further melting and pressure bonding are necessary for fixing, a sheet that has passed through the fixing unit 311 is conveyed to a second fixing unit 313 via an upper sheet conveyance path. Then, a sheet that has been subjected to additional melting and pressure bonding by the second fixing unit 313 is conveyed to the conveyance path 315 through a sheet conveyance path 314. When an image forming mode is two-sided, a sheet after fixing is conveyed to a sheet reversing path 316; after a front and back of the sheet are reversed by the sheet reversing path 316, the sheet is conveyed to a two-sided conveyance path 317; and an image is transferred to a second side of the sheet at the secondary transfer position 309.

Next, a configuration of the inserter 108 for inserting a sheet will be described.

The inserter 108 includes an inserter tray 321 and causes a sheet fed through a sheet conveyance path 322 to join the conveyance path 315. This makes it possible to insert a sheet at an arbitrary position into a group of a series of sheets conveyed from the printing apparatus 107 and convey them to a subsequent apparatus.

A sheet that has passed through the inserter 108 is conveyed to the inspection apparatus 109. In the inspection apparatus 109, cameras 331 and 332 are arranged in a form in which they are facing each other. The camera 331 is a camera for reading a top side of a sheet, and the camera 332 is a camera for reading a bottom side of a sheet. The inspection apparatus 109 reads an image of a sheet conveyed on a sheet conveyance path 333 using the cameras 331 and 332 when the sheet reaches a predetermined position and can determine whether or not an image printed on the sheet is normal. The display unit 241 displays a result of inspection by the inspection apparatus 109 and the like.

Next, a configuration of the large volume stacker 110 capable of stacking a large volume of sheets will be described.

The large volume stacker 110 includes a stack tray 341 as a tray for stacking sheets. A sheet that has passed through the inspection apparatus 109 is supplied to the large volume stacker 110 through a sheet conveyance path 344. The sheet passes from the sheet conveyance path 344 through a sheet conveyance path 345 and is stacked onto the stack tray 341. The large volume stacker 110 also includes an escape tray 346 as a discharge tray. The escape tray 346 is a discharge tray used for discharging a sheet determined to be a abnormal sheet by the inspection apparatus 109. When being discharged to the escape tray 346, a sheet is conveyed from the sheet conveyance path 344 to the escape tray 346 via a sheet conveyance path 347. When conveying a sheet to a post-processing apparatus downstream of the large volume stacker 110, the sheet is conveyed through a sheet conveyance path 348. A reversing unit 349 is a mechanism for reversing a front and back of a sheet. The reversing unit 349 is used for when stacking a sheet onto the stack tray 341. When stacking a sheet onto the stack tray 341 such that an orientation of the sheet at the time of input is the same as an orientation of the sheet at the time of output, the sheet is reversed once by the reversing unit 349. When conveying a sheet to the escape tray 346 or a subsequent post-processing apparatus (the finisher 111), the sheet is discharged as is, without being flipped, when stacking; therefore a sheet reversal operation by the reversing unit 349 is not performed.

The finisher 111 may apply post-processing to conveyed sheets according to functions specified by the user. Specifically, the finisher 111 includes a finishing function, such as stapling (1-position and 2-position stapling), punching (2-hole and 3-hole), and saddle stitching. The finisher 111 includes two discharge trays 351 and 352, and a sheet bundle that is not subjected to finishing processing is outputted to the discharge tray 351 via a sheet conveyance path 353. When performing finishing processing, such as stapling, a fed sheet is sent to a processor 355 via a sheet conveyance path 354, a finishing function specified by the user is executed, and the sheet is outputted to the discharge tray 352. The discharge trays 351 and 352 can each be moved up and down, and it is also possible to lower the discharge tray 351 and stack sheets on which finishing processing has been performed by the processor 355 on the discharge tray 351. When saddle stitching is specified, a saddle stitching processor 356 performs stapling processing at a center of a sheet bundle, and then folds the sheet bundle in two and outputs it to a saddle stitching tray 358 via a sheet conveyance path 357. The saddle stitching tray 358 has a conveyor-belt configuration and is configured to convey a saddle stitched bundle stacked on the saddle stitching tray 358 to a left side of FIG. 3.

Figure 4:
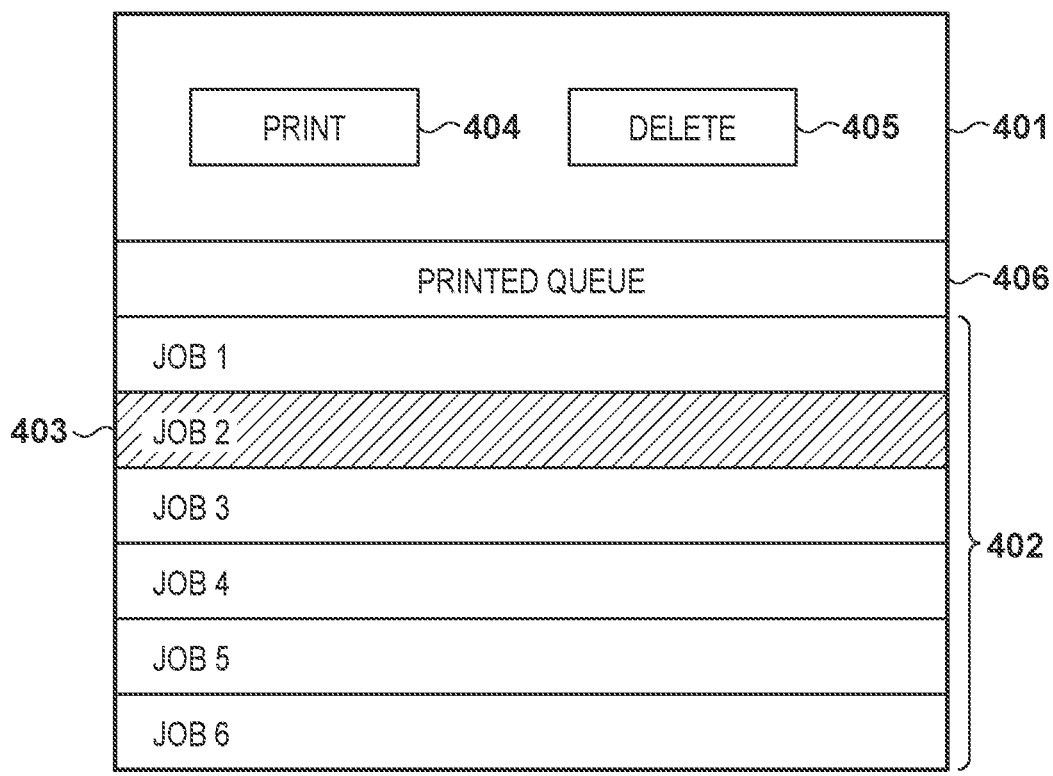
FIG. 4 is a diagram illustrating an example of a display screen of a printed queue displayed on a display of the external controller according to the first embodiment.

FIG. 4 is a diagram illustrating an example of a display screen 401 of a printed queue displayed on the display 212 of the external controller 102 according to the first embodiment.

The external controller 102 can hold printed jobs in a printed queue and re-execute a print job held in the printed queue to reprint the print job. Regarding this reprint, it is also possible to make a change in print settings for the held print job and print.

The display screen 401 for the printed queue is displayed on the display 212 of the external controller 102. A list display 402 displaying contents of a printed queue 406 indicates that six print jobs are stored in the printed queue 406. A print job issued from the external controller 102 is automatically held in the printed queue 406 when printing according to the print job is completed. Print data of a print job stored in the printed queue 406 is held in a state of having been converted into a bitmap, which is a state of immediately before being transmitted to the printing apparatus 107. Therefore, when a print job held in the printed queue is printed again with the same print settings, it is possible to print at high speed without performing RIP processing. Also, an upper limit number of print jobs that can be held in the printed queue is variable, and the upper limit number can be set by the user. A cursor 403 indicates a selected print job in the list, and by pressing a print button 404 or a delete button 405 in this state, the selected print job can be executed and printed or deleted. When the print button 404 is pressed, printing is performed via a print setting screen for a selected print job. It is also possible to print with exactly the same print settings or print with a change to some of the print settings. When the delete button 405 is pressed, a selected print job is deleted from the printed queue.

Figure 5:
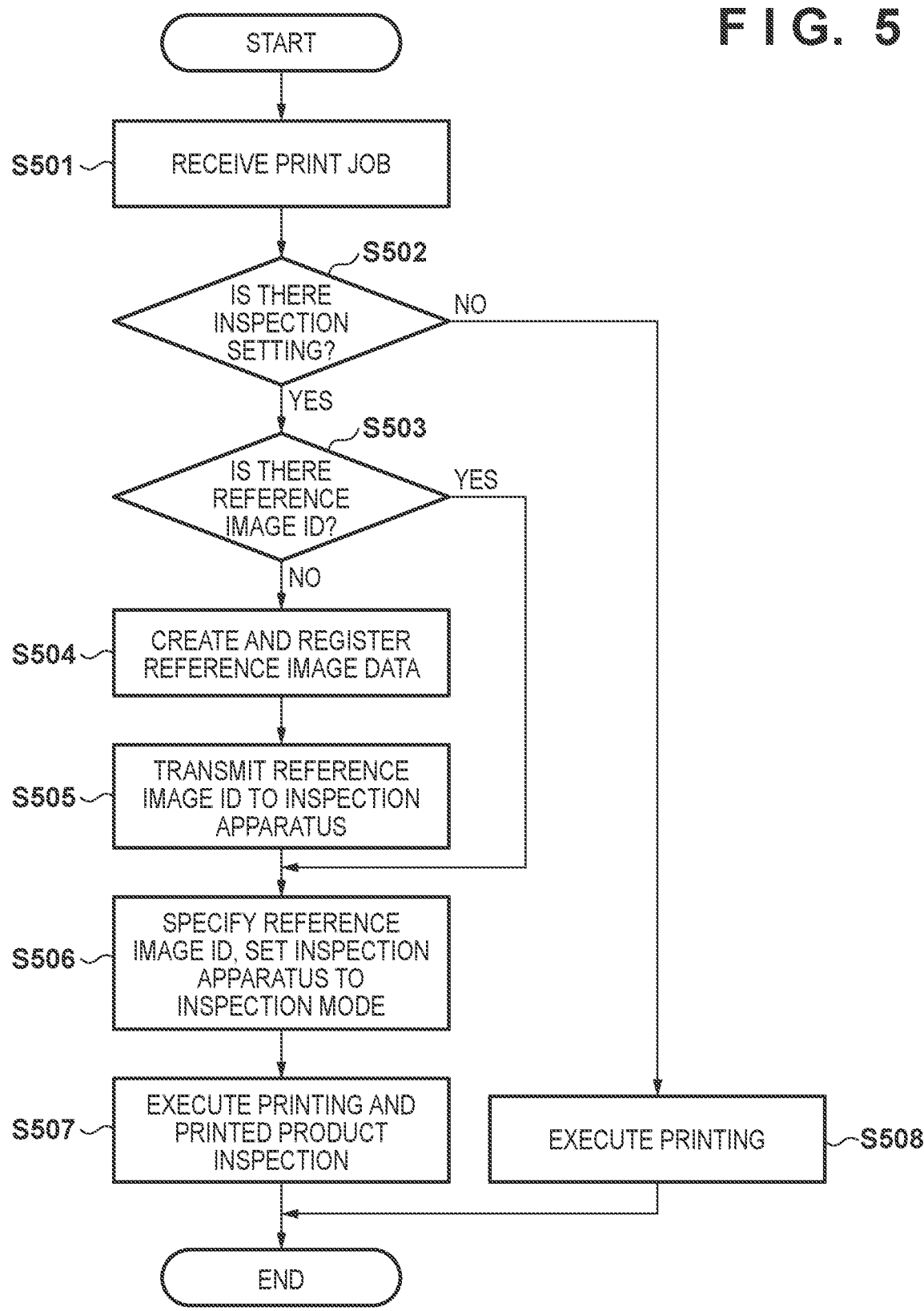
FIG. 5 is a flowchart for explaining processing of a print job by a printing apparatus according to the first embodiment.

FIG. 5 is a flowchart for explaining processing of a print job by the printing apparatus 107 according to the first embodiment. The processing explained in this flowchart is achieved by the CPU 222 of the printing apparatus 107 executing a program deployed in the memory 223.

First, in step S501, the CPU 222 receives a print job from the external controller 102. Next, the processing proceeds to step S502, and the CPU 222 determines whether or not a setting for inspection by the inspection apparatus 109 has been set for the received print job; if the inspection setting has been set, the processing proceeds to step S503, and if the inspection setting has not been set, the processing proceeds to step S508. In step S508, the CPU 222 executes print processing and terminates this processing without inspecting a printed product using the inspection apparatus 109.

In step S503, the CPU 222 determines whether identification information (ID) of a reference image (reference image ID) is specified in the inspection setting of the print job. If the reference image ID is specified here, the processing proceeds to step S506; if not, the processing proceeds to step S504. In step S504, the CPU 222 creates reference image data for inspection from image data of the print job received from the external controller 102 and registers the reference image data as a reference image in the inspection apparatus 109.

At this time, the inspection apparatus 109 stores the received reference image data as a reference image in the HDD 272. The inspection apparatus 109 collectively manages, in print job units, a plurality of reference images that accords with images to be printed according to a corresponding print job, a type of the images, and the like. When all the reference images for one print job are received, a reference image ID—uniquely determined in print job units—is issued for the print job and notified to the printing apparatus 107. Accordingly, by the user, who inputs a print job, specifying the reference image ID corresponding to the print job, each printed product is inspected by comparison being performed for each print image to be printed according to the print job with a corresponding reference image in order according to a printing order in which printing is to be performed.

The processing proceeds to step S505, and the CPU 222 transmits the reference image ID—issued in print job units—received from the inspection apparatus 109 to the external controller 102. By this, the external controller 102 additionally stores the reference image ID in a print attribute of the printed queue. When a print job stored in the printed queue is re-executed, the external controller 102 specifies the reference image ID in association with the print job. Thus, the printing apparatus 107 can perform a reprint of the print job and inspection of printed products at the time of a reprint without creating and registering reference images for the print job for which a reprint has been instructed.

Then, the processing proceeds to step S506, the printing apparatus 107 specifies the reference image ID and causes the inspection apparatus 109 to transition to an inspection mode, and the processing proceeds to step S507. The inspection apparatus 109 that has transitioned to the inspection mode in this way waits for a printed sheet to be conveyed so as to capture it by the imaging unit 240. In step S507, the CPU 222 performs print processing for executing a print job and inspection processing by the inspection apparatus 109. When the print job is completed, the inspection apparatus 109 is notified that the print job has been completed. By this, the inspection mode of the inspection apparatus 109 is terminated.

According to the processing explained in this flowchart, the user can automatically register reference images and inspect printed products using registered reference images simply by performing an inspection setting on a print job and inputting the print job.

Figure 6:
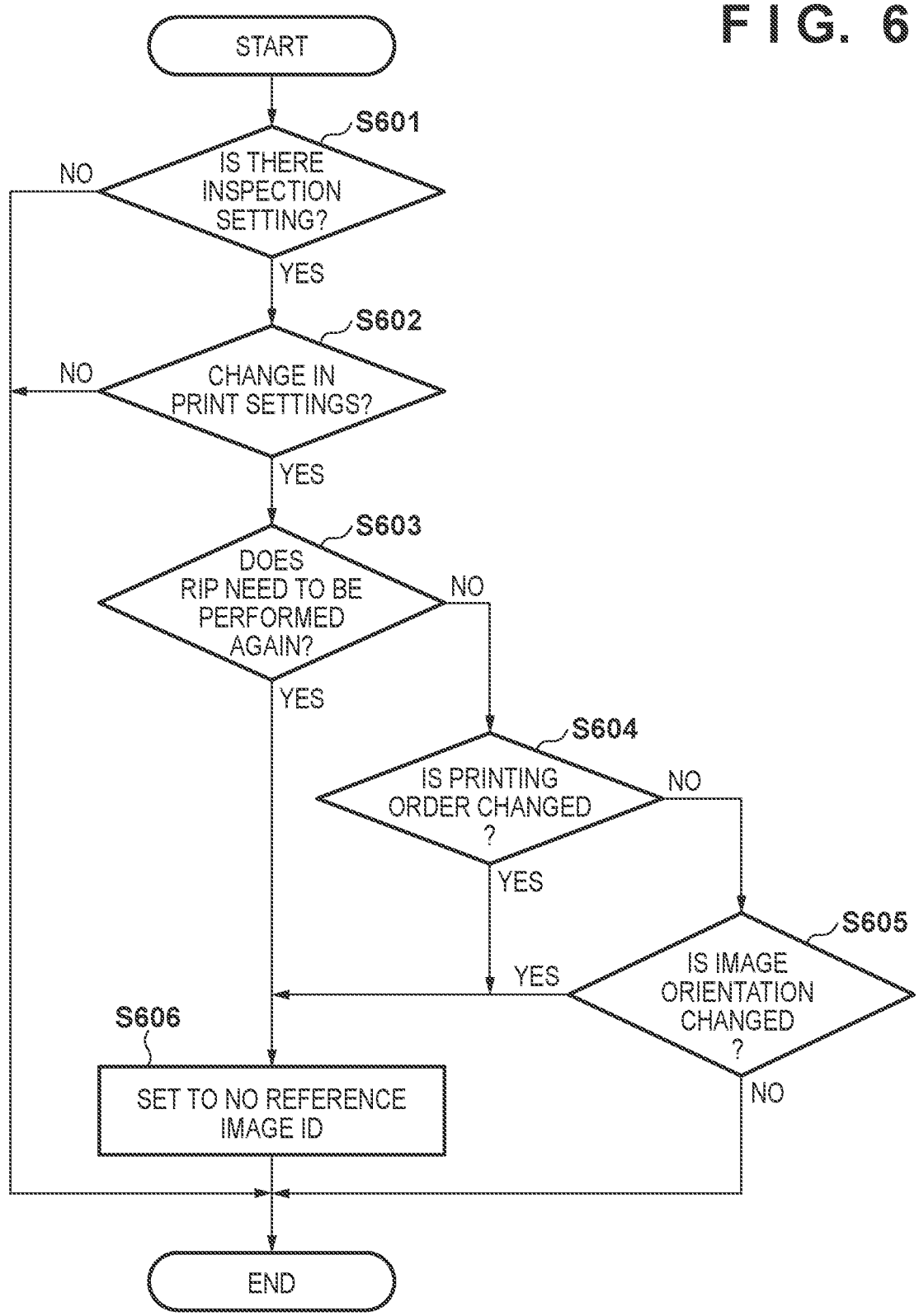
FIG. 6 is a flowchart for explaining processing of the external controller according to the first embodiment.

FIG. 6 is a flowchart for explaining processing of the external controller 102 according to the first embodiment. Here, a description will be given using an example of processing for deciding a reference image ID for when a change has been made in print settings at the time of a reprint. The processing explained in this flowchart is achieved by the CPU 208 of the external controller 102 executing a program deployed in the memory 209.

In the first embodiment, as described above, the external controller 102 holds a reference image ID used in inspection by the inspection apparatus 109 in a print attribute of a print job stored in the printed queue. Therefore, when reprinting a print job, a reference image ID of the print job stored in the printed queue is specified to instruct a reprint. Thus, at the time of a reprint, the printing apparatus 107 can perform inspection printing by indicating reference images to the inspection apparatus 109 using a specified reference image ID without creating reference images again.

However, inspection of the first embodiment is configured to sequentially compare reference images stored in the HDD 272 of the inspection apparatus 109 and scanned images of printed products captured by the imaging unit 240. Even if it is a reprint, depending on the content of a change in print settings, RIP may be performed again, a printing order may change, or a print orientation may change. In that case, in a configuration of the aforementioned embodiment, there is a possibility that an inspection abnormality may occur if a reference image is not recreated. Therefore, at the time of a change in print settings of reprint of a print job stored in the printed queue, the external controller 102 determines whether or not it is necessary to recreate a reference image and specifies a reference image ID in a print job only when it is not necessary to newly create the reference image.

The processing explained in the flowchart of FIG. 6 is started when a print job stored in the printed queue of the external controller 102 is re-executed, and determines whether or not to set a reference image ID. First, in step S601, the CPU 208 determines whether or not a setting for inspection by the inspection apparatus 109 is set for a print job for which a reprint has been instructed; if the inspection setting has been set, the processing proceeds to step S602, and if the inspection setting has not been set, the processing is simply terminated. In step S602, the CPU 208 determines whether or not a change has been made in print settings of the print job for which a reprint has been instructed; if a change has been made in the print settings, the processing proceeds to step S603, and if a change has not been made in the print settings, the processing is simply terminated. At this time, a reference image ID stored in the print job is specified as is for the print job instructed to be reprinted.

In step S603, the CPU 208 determines whether or not RIP needs to be performed again for a corresponding reference image due to the change in the print settings; if it is determined that RIP needs to be performed again, the processing proceeds to step S606, and otherwise, the processing proceeds to step S604. Here, a condition for performing RIP again may be, for example, a case where a print image itself is changed due to a change of setting of an image processing for the print job, a case where a printing magnification is changed due to a change of an output sheet size for the print job, a case where an NUP setting which changes the number of images to be printed on one page is changed, and the like.

In step S604, the CPU 208 determines whether or not a printing order is changed due to the change in the print settings; if the printing order is changed, the processing proceeds to step S606, and otherwise, the processing proceeds to step S605. A condition for the printing order being changed is, for example, a case where the side of the sheet that will face up when the sheet is discharged is changed. In addition, depending on discharge-type accessories that are connected downstream of the printing apparatus 107, it may be necessary to output sheets in reverse order of normal printing; therefore, a change of a printing order is depending largely on a change of configurations of the discharge-type accessories.

In step S605, the CPU 208 determines whether or not a print orientation is changed due to the change in the print settings; if it is determined that the print orientation is changed, the processing proceeds to step S606, and otherwise, the processing is terminated. Conditions for the print orientation being changed may include, for example, a change of a position of finishing, such as stapling and punching.

Since a reference image needs to be recreated, in step S606, the CPU 208 sets the reference image ID to none in the inspection setting of the print job. By this, the printing apparatus 107 that has received this print job determines that processing for creating reference image data is necessary and, in step S504 of FIG. 5, creates reference image data and registers it in the inspection apparatus 109.

Figure 7A:
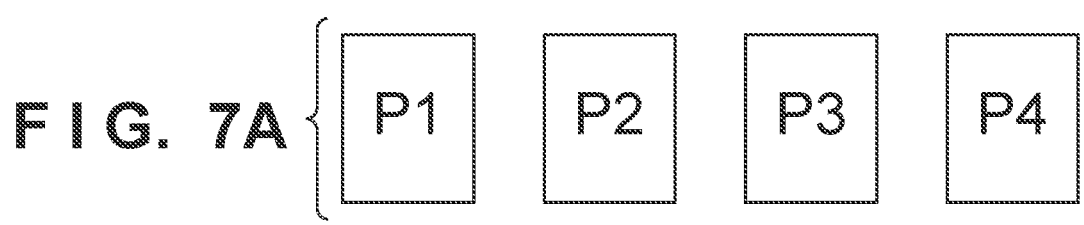
FIGS. 7A and 7B are diagrams for describing an example of a change in print settings for which the external controller determines in step S603 of FIG. 6 that RIP needs to be performed again.
Figure 7B:
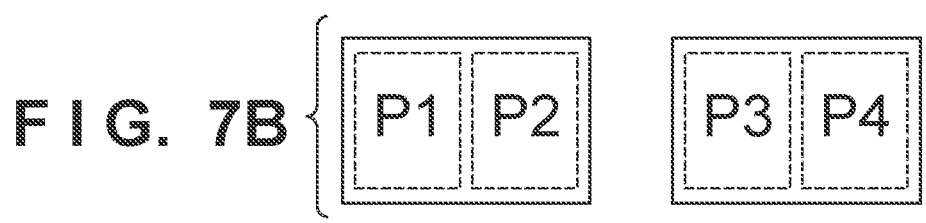

FIGS. 7A and 7B are diagrams illustrating an example of a change in print settings that the external controller 102 determines in step S603 of FIG. 6 requires the RIP to be performed again.

FIG. 7A illustrates a printing order (P1 to P4) and a print orientation prior to a change in print settings for a print job. Here, each of four pages printed according to the print job is printed on one side of each sheet in order from P1 (a first page) to P4 (fourth page) on a total of four sheets (P1 to P4).

The print orientation here is such that when a sheet discharged from the printing apparatus 107 is seen from above, top of each sheet is towards the back side of the printing apparatus 107 and bottom of each sheet is towards the front side of the printing apparatus 107.

FIG. 7B illustrates a case in which the print job is printed in a 2UP in which an image of two pages are printed on one side of a sheet. At this time, an image of two pages is printed on one side of a sheet, and a total of two sheets are printed. In this case, since an image to be printed on a sheet has changed from a case in FIG. 7A, RIP must be performed again by the external controller 102. In this case, since printed images to be inspected change, if reference images are not recreated, it results in an inspection abnormality. FIGS. 7A and 7B only show an example of a case in which RIP is performed again; of course, RIP may be performed again for other setting changes.

FIGS. 8A to 8D are diagrams illustrating examples of a change in print settings for which the external controller 102 determines in step S604 of FIG. 6 that a printing order will change.

Figure 8A:
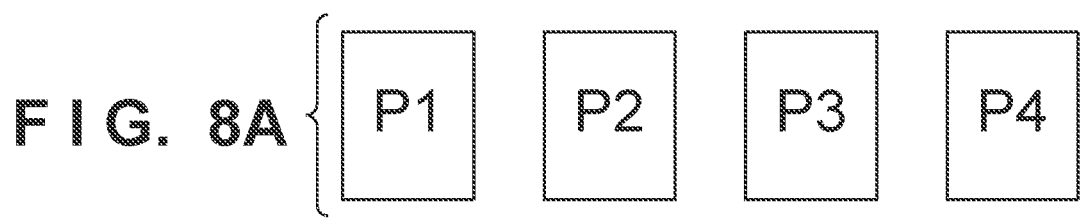
FIGS. 8A to 8D are diagrams for describing examples of a change in print settings for which the external controller determines in step S604 of FIG. 6 that a printing order is changed.
Figure 8B:
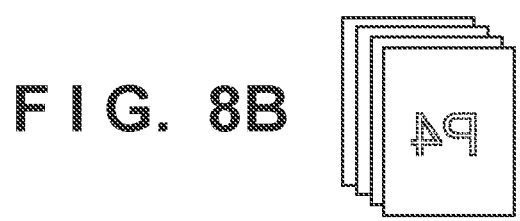

FIG. 8A illustrates a printing order (P1 to P4) and a print orientation prior to a setting change. The printing order and the print orientation here are the same as in the aforementioned FIG. 7A. Assume that print settings include one-sided printing and face-down discharge. FIG. 8B is a diagram of sheets discharged onto the discharge tray 351 of the finisher 111 seen from above. In the first embodiment, in face-down discharge, four sheets are printed in an order from P1 to P4 as in FIG. 8A and are reversed by the sheet reversing path 316 such that they are discharged to the discharge tray 351 with a printed side facing down as shown in FIG. 8B.

Figure 8C:
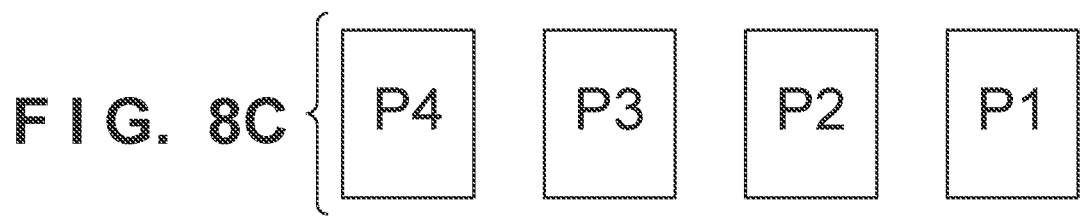
Figure 8D:
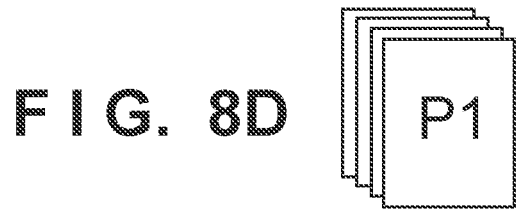

FIG. 8C illustrates a printing order (P4 to P1) and a print orientation for when a change has been made in print settings from face-down discharge to face-up discharge. In the first embodiment, face-up discharge is realized by printing a sheet as is without passing it through the sheet reversing path 316. Therefore, when printing is performed in the order of FIG. 8A, a sheet on which P4 is printed is outputted at the top, resulting in a final output sheet bundle being in reverse order. Therefore, by printing in reverse order of FIG. 8A as illustrated in FIG. 8C so as to face-up discharge sheets in which a sheet on which the first page (P1) is printed is discharged at the top of the sheets as illustrated in FIG. 8D, a correct output result can be obtained.

Since the first embodiment is configured in such a way that an inspection error occurs even when a printing order is changed, reference images are recreated even in such a case. FIGS. 8A to 8D show examples of a case where a printing order is changed; of course, the printing order may be changed by other setting changes.

FIGS. 9A to 9F are diagrams illustrating examples of a change in print settings for which the external controller 102 determines in step S605 of FIG. 6 that an image orientation will change.

Figure 9A:
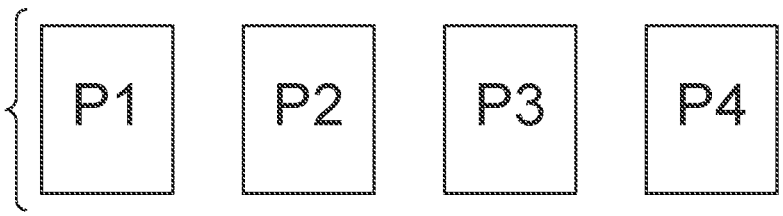
FIGS. 9A to 9F are diagrams for describing examples of a change in print settings for which the external controller determines in step S605 of FIG. 6 that an image orientation is changed.
Figure 9B:
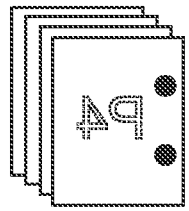
Figure 9C:
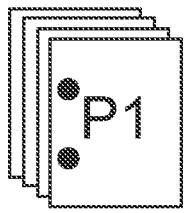

FIG. 9A illustrates a printing order (P1 to P4) and a print orientation prior to a change in print settings. The printing order and the print orientation here are the same as in FIG. 7A. Assume that print settings here include one-sided printing and a left punch hole setting. FIG. 9B is a diagram of sheets discharged onto the discharge tray 351 of the finisher 111 seen from above. Assume that punch holes according to the first embodiment are made one sheet at a time on a trailing end in a conveyance direction. Therefore, when punch holes are made on a trailing end of a sheet in the conveyance direction when the sheet is faced down due to being reversed by the sheet reversing path 316, it results in a discharge state illustrated in FIG. 9B. Therefore, as illustrated in FIG. 9C, an output result is that punch holes are made on a left side of sheets.

Figure 9D:
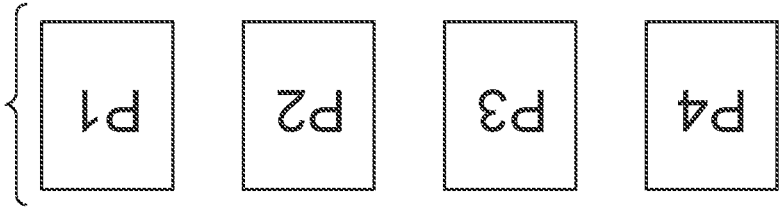
Figure 9E:
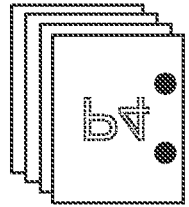
Figure 9F:
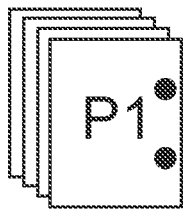

FIG. 9D illustrates a printing order (P1 to P4) and a print orientation for when a setting is changed from a left punch hole setting to a right punch hole setting. In the first embodiment, in contrast to when left punch holes are set, punch holes on a right side of a sheet are realized by printing an image after the image is rotated 180 degrees. Therefore, in contrast to FIG. 9A, images are printed after being rotated 180 degrees as illustrated in FIG. 9D, resulting in a discharge state illustrated in FIG. 9E. As illustrated in FIG. 9F, an output result is that punch holes are made on a right side of sheets, and the sheets are discharged facing up.

Since the first embodiment is configured in such a way that an inspection error occurs even when a print orientation is changed, it becomes necessary to recreate reference image data even in such a case. FIGS. 9A to 9F show examples of a case where a print orientation is changed; however, of course, the print orientation may be changed by other setting changes.

As described above, by virtue of the first embodiment, when reprinting a print job held in a printed queue, even if settings of the print job are changed, it is possible to set so as to automatically recreate reference image data as necessary. Thus, it becomes possible to prevent a normal printed product from being determined as abnormal in inspection due to a reference image being different. This enables efficient inspection printing.

Second Embodiment

In the aforementioned first embodiment, reference image data is recreated not only when RIP processing needs to be performed again but also when a printing order and a print orientation change. However, when it is merely a change of a printing order or a print orientation, an image itself does not actually change. Therefore, when the inspection apparatus 109 includes an order change function or an image rotation function for reference images, it is not necessary to recreate reference images, and reference images need be recreated only when it is necessary to perform RIP processing again. When a printing order or a print orientation changes, the inspection apparatus 109 may be instructed to change an order of reference images or rotate the reference images before a start of a print job. Such an embodiment will be described as a second embodiment.

Figure 10:
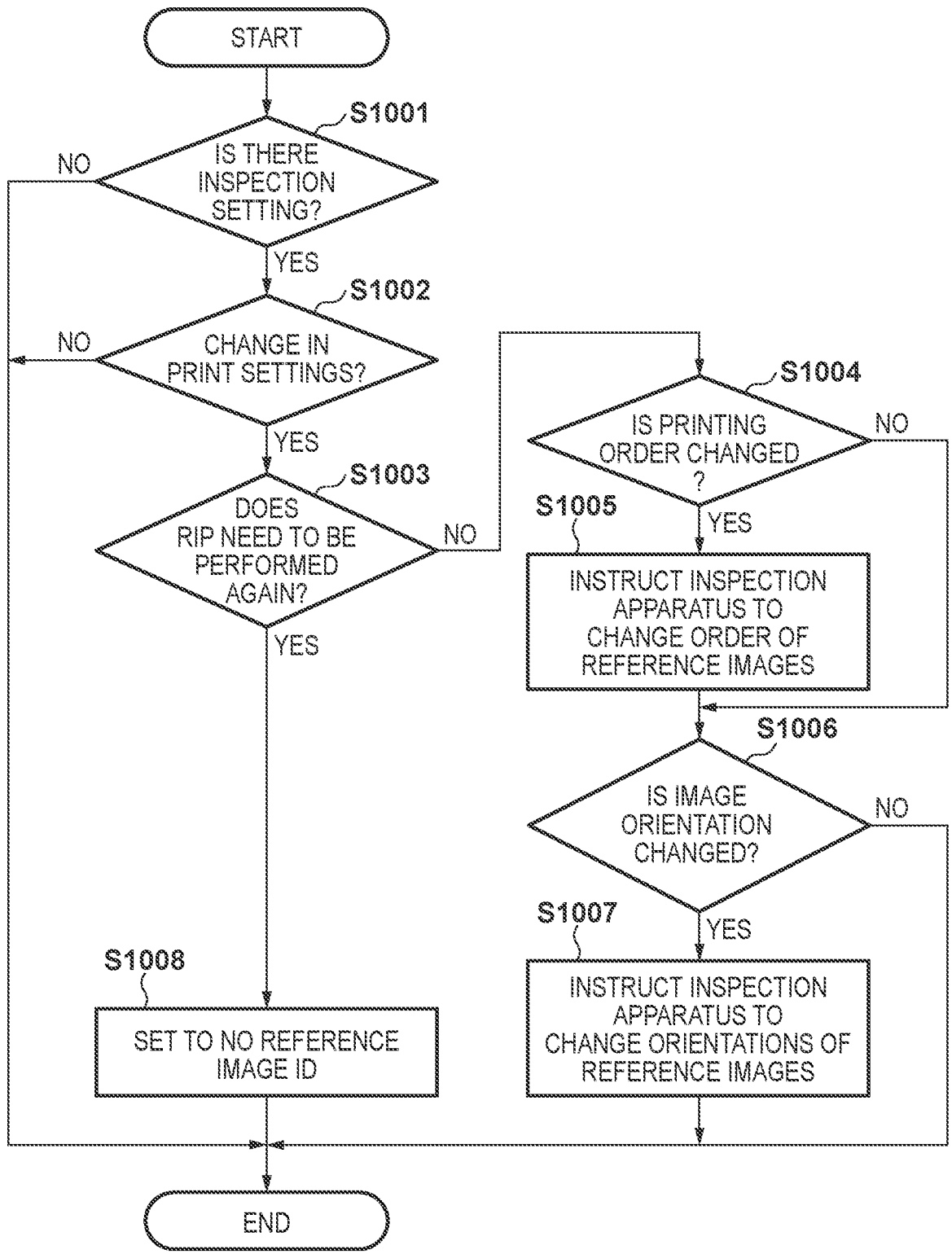
FIG. 10 is a flowchart for explaining processing of the external controller according to a second embodiment.

FIG. 10 is a flowchart for explaining processing of the external controller 102 according to the second embodiment. Here, a description will be given using an example of processing for determining a reference image ID in a change in print settings at the time of a reprint and determining a change of an order of reference images, and a change of an orientation of reference images. The processing explained in this flowchart is achieved by the CPU 208 of the external controller 102 executing a program deployed in the memory 209. The processing explained in this flowchart is started at the time of reprinting a print job stored in the printed queue of the external controller 102 and determines whether or not to set a reference image ID.

First, in step S1001, the CPU 208 determines whether or not a setting for inspection by the inspection apparatus 109 is set for a print job for which a reprint has been instructed; if the inspection setting has been set, the processing proceeds to step S1002, and if the inspection setting has not been set, the processing is terminated. In step S1002, the CPU 208 determines whether or not a change has been made in print settings of the reprint job; if a change has been made in the print settings, the processing proceeds to step S1003, and if a change has not been made in the print settings, the processing is terminated. If a change has not been made in the print settings, the stored reference image ID is specified as is in the reprint job.

In step S1003, the CPU 208 determines whether RIP needs to be performed again due to the change in the print settings; if it is determined that RIP needs to be performed again, the processing proceeds to step S1008, and otherwise, the processing proceeds to step S1004. Since a reference image needs to be recreated, in step S1008, the CPU 208 sets the reference image ID to none in the inspection setting of the reprint job. By this, the printing apparatus 107, in the aforementioned step S503 of FIG. 5, determines that processing for creating reference image data is necessary and, in step S504, executes the processing for creating reference image data and registering the reference image data in the inspection apparatus 109 as reference images for the reprint job.

When it is determined that RIP does not need to be performed again, the CPU 208 determines whether or not a printing order will change due to the change in the print settings in step S1004; if it is determined that the printing order is changed in step S1004, the processing proceeds to step S1005, and if not, the processing proceeds to step S1006. In step S1005, the CPU 208 instructs the inspection apparatus 109 to change an order of reference images and proceeds to step S1006. An instruction for changing an order of reference images can be realized by passing, to the inspection apparatus 109, list data in which a reference image ID is associated with an order of page numbers after a change of the order of reference images.

In step S1006, the CPU 208 determines whether or not a print orientation is changed due to the change in the print settings; if it is determined that the print orientation is changed, the processing proceeds to step S1007, and otherwise, the processing is terminated. In step S1007, the CPU 208 instructs the inspection apparatus 109 to rotate the reference images. This rotation instruction instructs the inspection apparatus 109 how many times to rotate a reference image of which page number, and then this processing is terminated.

As described above, by virtue of the second embodiment, it is possible to, when settings of a reprint job for which a print job stored in a printed queue is re-executed is changed, minimize recreation of reference image data, which makes it possible to perform more efficient inspection printing.

In the above-described embodiments, descriptions have been given using examples of reprinting a print job stored in a printed queue; however, the present invention can be applied to, for example, printing of a print job held by a box function. That is, the print job held by the box function is printed according to temporary predetermined print settings unless a change is made in the print settings. Therefore, also for that case, a configuration may be taken so as to create reference image data with the predetermined print settings, register reference image data as reference images in an inspection apparatus, and perform inspection printing of a print job held by the box function.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-140268, filed Aug. 30, 2021, which is hereby incorporated by reference herein in its entirety.

What is claimed is:

1. An information processing apparatus operable to input a print job to a printing apparatus and cause the printing apparatus to print the print job, the information processing apparatus comprising:
   one or more memories storing instructions; and
   one or more processors that execute the instructions to:
   hold a print job and identification information of a reference image that is associated with the print job and is used in inspection printing of the print job;
   in response to an instruction to reprint the held print job, determine whether or not a change has been made in print settings of the held print job and, in a case where it is determined that the change has been made in the print settings of the held print job to be reprinted, determine whether or not inspection printing that uses the reference image associated with the held print job is possible based on the change that has been made in the print settings of the held print job to be reprinted; and
   in a case that it is determined that the inspection printing that uses the reference image associated with the held print job is not possible based on the change that has been made in the print settings of the held print job to be reprinted, control so as to transmit information for generating a reference image based on the changed print settings of the held print job to be reprinted to the printing apparatus.

2. The information processing apparatus according to claim 1, wherein in the control, the one or more processors are configured to: in a case that it is determined that the inspection printing that uses the reference image associated with the held print job is possible based on the change that has been made in the print settings of the held print job to be reprinted, set the identification information of the reference image in the held print job and transmit the held print job to the printing apparatus.

3. The information processing apparatus according to claim 1, wherein in the determination, the one or more processors are configured to: in a case where a print image itself to be printed by the reprint changes due to the change of the print settings, determine that the inspection printing that uses the reference image associated with the held print job is not possible.

4. The information processing apparatus according to claim 1, wherein in the determination, the one or more processors are configured to: in a case where a size of an image to be printed by the reprint changes due to the change of the print settings, determine that the inspection printing that uses the reference image being-associated with the held print job is not possible.

5. The information processing apparatus according to claim 1, wherein in the determination, the one or more processors are configured to: in a case where a number of images to be printed on one page by the reprint changes due to the change of the print settings, determine that the inspection printing that uses the reference image associated with the held print job is not possible.

6. The information processing apparatus according to claim 1, wherein in the determination, the one or more processors are configured to: in a case where an order of images to be printed by the reprint changes due to the change of the print settings, determine that the inspection printing that uses the reference image associated with the held print job is not possible.

7. The information processing apparatus according to claim 1, wherein in the determination, the one or more processors are configured to: in a case where an orientation of an image to be printed by the reprint changes due to the change of the print settings, determine that the inspection printing that uses the reference image being-associated with the held print job is not possible.

8. A method of controlling an information processing apparatus operable to input a print job to a printing apparatus and cause the printing apparatus to print the print job, the method comprising:
holding a print job and identification information of a reference image that is associated with the print job and is used in inspection printing of the print job;
in response to an instruction to reprint the held print job, determining whether or not a change has been made in print settings of the held print job and, in a case where it is determined that the change has been made in the print settings of the held print job to be reprinted, determining whether or not inspection printing that uses a reference image associated with the held print job is possible based on the change that has been made in the print settings of the held print job to be reprinted; and
in a case that it is determined that the inspection printing that uses the reference image associated with the held print job is not possible based on the change that has been made in the print settings of the held print job to be reprinted, controlling so as to transmit information for generating a reference image based on the changed print settings of the held print job to be reprinted to the printing apparatus.

9. A non-transitory computer-readable storage medium storing a program for causing a processor to execute a method of controlling an information processing apparatus operable to input a print job to a printing apparatus and cause the printing apparatus to print the print job, the method comprising:
holding a print job and identification information of a reference image that is associated with the print job and is used in inspection printing of the print job;
in response to an instruction to reprint the held print job, determining whether or not a change has been made in print settings of the held print job and, in a case where it is determined that the change has been made in the print settings of the held print job to be reprinted, determining whether or not inspection printing that uses a reference image associated with the held print job is possible based on the change that has been made in the print settings of the held print job to be reprinted; and
in a case that it is determined that the inspection printing that uses the reference image associated with the held print job is not possible based on the change that has been made in the print settings of the held print job to be reprinted, controlling so as to transmit information for generating a reference image based on the changed print settings of the held print job to be reprinted to the printing apparatus.

\* \* \* \* \*